United States Patent [19]

Tanaka et al.

[11] Patent Number: 5,002,718

[45] Date of Patent: Mar. 26, 1991

[54] METHOD OF BLOW MOLDING A FLAT CONTAINER HAVING PORTIONS WITH GREATLY VARYING WALL THICKNESS

[75] Inventors: Hirosi Tanaka; Kozo Morisige, both of Chiba, Japan

[73] Assignee: Mitsui Petrochemical Industries, Ltd., Tokyo, Japan

[21] Appl. No.: 381,242

[22] Filed: Jul. 18, 1989

[30] Foreign Application Priority Data

Jul. 22, 1988 [JP] Japan .................................. 63-183054
Apr. 4, 1989 [JP] Japan .................................... 1-85297

[51] Int. Cl.$^5$ ...................... B29C 49/04; B29C 49/10; B29C 49/16
[52] U.S. Cl. .................................... 264/530; 264/529; 264/532; 264/DIG. 33; 425/529; 425/530
[58] Field of Search ............... 264/532, 529, 530, 541, 264/DIG. 33; 425/529, 530, 538

[56] References Cited

U.S. PATENT DOCUMENTS

| | | | |
|---|---|---|---|
| 2,953,817 | 9/1960 | Miller et al. | 264/529 |
| 3,012,286 | 12/1961 | Gasmire | 264/529 |
| 3,125,619 | 3/1964 | Miller | 264/DIG. 33 |
| 3,311,684 | 3/1967 | Heider | 264/532 |
| 3,362,043 | 1/1968 | Langdon et al. | 264/529 |
| 3,410,937 | 11/1968 | Winchester, Jr. | 264/529 |
| 3,425,090 | 2/1969 | Nave et al. | 264/529 |
| 3,899,279 | 8/1975 | Hudson et al. | 264/532 |
| 4,199,129 | 4/1980 | Fischer | 264/529 |
| 4,806,093 | 2/1989 | Linss et al. | 425/529 |

FOREIGN PATENT DOCUMENTS

| | | | |
|---|---|---|---|
| 58-87025 | 5/1983 | Japan | 264/529 |
| 1435646 | 5/1976 | United Kingdom | 264/530 |

Primary Examiner—Jan H. Silbaugh
Assistant Examiner—Catherine Timm
Attorney, Agent, or Firm—Birch, Stewart, Kolasch & Birch

[57] ABSTRACT

A flat container may be produced by extruding a molten resin to form a parison, closing the bottom of the parison, preblowing the parison such that the inner surfaces do not contact together, drafting the parison in a molten state, expanding the parison with the outer edge of the parison extending beyond that of the cavity of a mold, pinching the expanded parison with the mold to fuse the outer edge portions together along the outer edge of the cavity, and forcing a pressurized fluid into the parison pinched by the mold so that the parison is shaped in close contact with the inside surfaces of the mold cavity.

4 Claims, 3 Drawing Sheets

 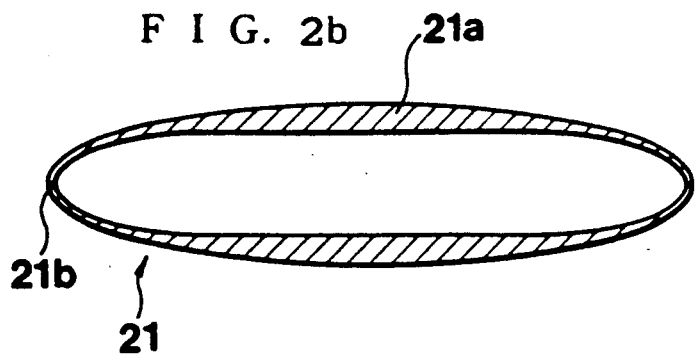
FIG. 2a  FIG. 2b
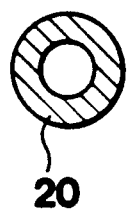 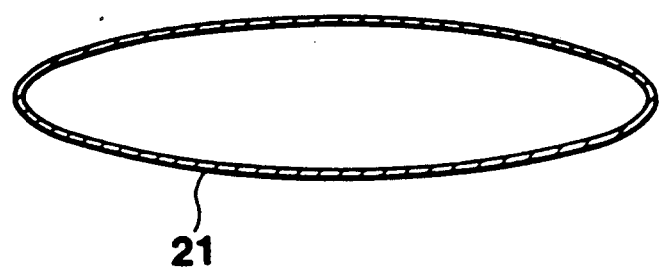
FIG. 3a  FIG. 3b
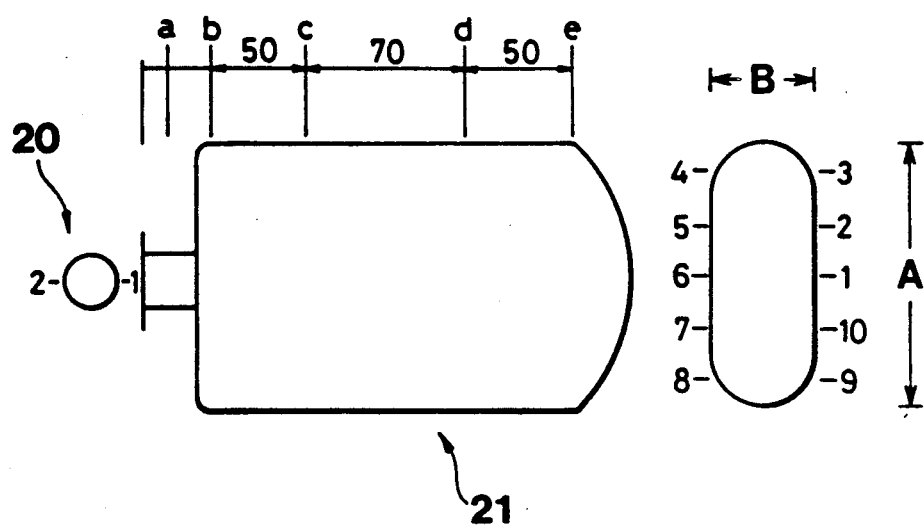
FIG. 4

METHOD OF BLOW MOLDING A FLAT CONTAINER HAVING PORTIONS WITH GREATLY VARYING WALL THICKNESS

BACKGROUND OF THE INVENTION

The present invention relates to a method of producing a flat container that has a large wall thickness in the mouth and shoulder portions and a small wall thickness in the body and has a large area of flatness.

It is fairly difficult to produce containers, in particular flat ones, having a large wall thickness in the mouth and shoulder portions and, a small wall thickness in the body and none of the methods presently available are completely satisfactory. Such containers are currently produced by the following methods:

(1) a method using a flat parison in combination with a parison controller;

(2) a method using a lateral expander (Japanese Patent Public Disclosure No. 61-134224); and (3) a sheet blowing technique.

These methods, however, have their own problems. The first method produces a flat mouth portion and incurs difficulty in providing a uniform wall-thickness distribution in the body. The second method involves difficulty in achieving a uniform wall-thickness distribution in the body. The third method presents difficulty in attaining a uniform wall-thickness distribution in the mouth portion.

SUMMARY OF THE INVENTION

The principal object, therefore, of the present invention is to eliminate these defects of the prior art and to provide a process for producing a flat container having portions with greatly varying wall thicknesses in that it has a large wall thickness in the mouth and shoulder portions and a small wall thickness in the body.

This object of the present invention can be attained by a process for producing a blow molded flat container having portions with greatly varying wall thicknesses from molten resin, which process comprises:

(a) extruding the molten resin from a die head to form a parison;

(b) closing the bottom of the parison by pinching;

(c) forming a thick-wall portion with a fluid being forced into the parison at a sufficient pressure to prevent contact between inner surfaces of the parison;

(d) drawing the parison longitudinally at a ratio of at least 1.1 under the state of the parison being at a temperature not lower than the melting point of the resin;

(e) expanding the parison to form a thin-walled portion with a differential pressure being created across the wall of the parison;

(f) confining the expanded parison in a split mold having a cavity of a shape conforming to the contour of the flat container, with the outer edge of the parison extending beyond that of the mold cavity, so that the edge portions are fused together and the parison becomes flat; and (g) forcing a pressurized fluid into the parison confined in the mold so that the parison is shaped in close contact with the inside surfaces of the mold cavity.

In a preferred embodiment, the ratio of the wall thickness of the thicker portion of the molded container to that of the thinner portion is at least 5.

In another preferred embodiment, the flatness of the molded container (i.e., the ratio of its larger diameter to the smaller diameter) is at least 2.5.

In yet another preferred embodiment, the resin is polypropylene, polyethylene or poly(4-methyl-1-pentene).

BRIEF DESCRIPTION OF THE DRAWINGS

FIGS. 2a and 2b shown in cross section the neck and body portions, respectively, of a container produced by a prior art method;

FIGS. 3a and 3b show in cross section the neck and body portions, respectively, of a container produced by the method of the present invention; and FIG. 4 is a diagram showing the profile and dimensions of the container produced in the Example.

DETAILED DESCRIPTION OF THE INVENTION

The process of the present invention is described hereinafter in more detail. In accordance with the present invention, a molded container may be produced with a commonly employed extruder and die. FIGS. 1a to 1d show the sequence of steps for producing a container using a die 1 equipped with an air nozzle 3 for expanding a parison 2 extruded therefrom.

Figure 1A:
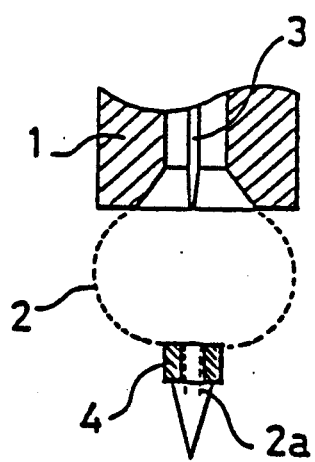
FIGS. 1a, 1b, 1c and 1d are schematic views showing four of the steps of the process of the present invention.

As shown in FIG. 1a, the parison 2 as a thin tube of molten resin emerging from the die 1 is sealed at its bottom 2a by means of a parison chuck 4. At the same time, a given amount of compressed air is supplied into the parison from the air nozzle 3 in the die 1 so as to expand the parison slightly, namely, to an extent that prevents contact between the inner surfaces of the parison. The parison at this stage has the thickness necessary to make the thick-walled portions, such as the mouth and shoulder portions, of a complete container. In FIGS. 1a to 1e, the parison is illustrated by the dashed line for the sake of clarity.

Figure 1B:
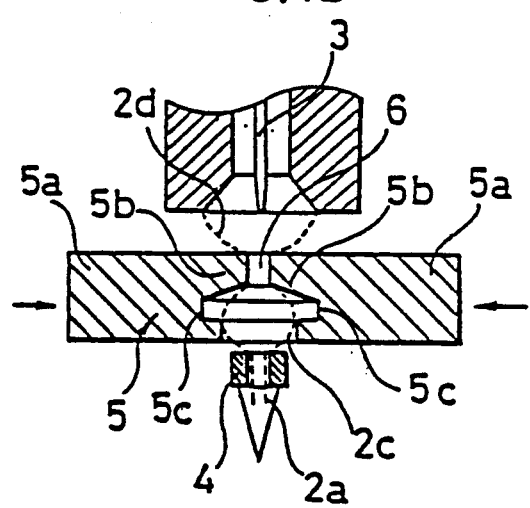

The upper part of the slightly expanded parison 2, as shown in FIG. 1a, is confined in the first split mold 5, as shown in FIG. 1b, so that the parison is divided into two portions, one being indicated by 2c and used to form the intended container, and the other being indicated by 2d, and to be removed at a later stage. As shown in FIG. 1b, the first mold 5 consists of a pair of mold halves 5a, and those portions which are to make contact with the parison 2 are so shaped as to impart predetermined contours to the parison. In the case shown in FIG. 1b, the upper portion 5b of each mold half is intended to provide the parison 2 with a shape corresponding to the mouth of a container, whereas the middle to lower portion 5c will provide a shape corresponding to the shoulder of the container. Thus, the gap between the two upper portions 5b will serve as an opening 6 for the mouth.

Figure 1C:
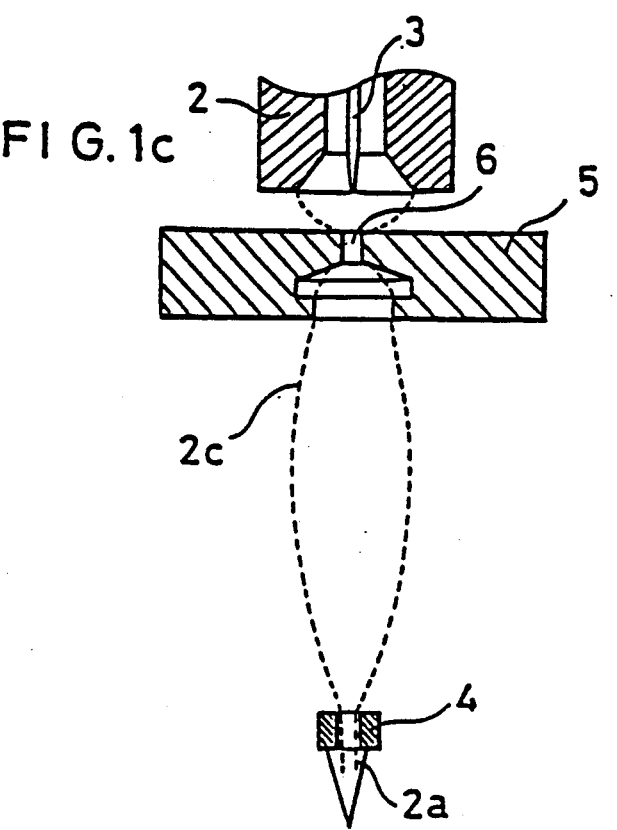

After completion of the molding of the mouth and shoulder portions of a container by means of the first mold 5, the parison 2, while it remains molten, with its temperature not lower than the melting point of the resin, is drawn or drafted as shown in FIG. 1c by moving the parison chuck 4 downward by a distance corresponding to the length of the body of the container. The drawing speed should be much faster than the drawdown rate of the parison. Simultaneously with this drawing or drafting operation, compressed air is blown into the drawn portion 2c of the parison from the air nozzle 3 through the opening 6 so as to expand the portion 2c by a predetermined degree (preblowing). The draw or draft ratio should be at least 1.1 in order to produce a container having a large wall thickness in the mouth and shoulder portions and a small wall thickness in the body.

Figure 1D:
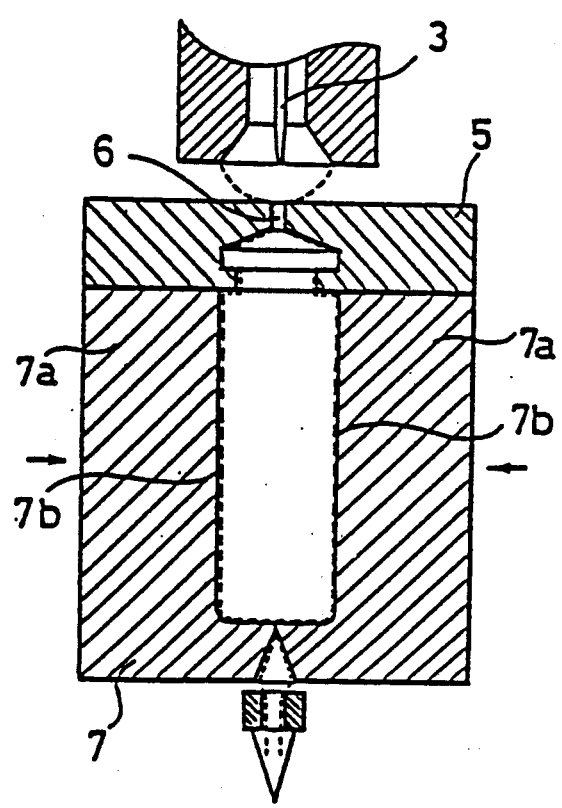

In the next step, a second split mold 7 is brought into contact with the first split mold 5 and clamped, as shown in FIG. 1d. The second mold 7 is composed of a pair of mold halves 7a and has a cavity 7b the inside surfaces of which will come in contact with the portion 2c of the parison to provide it with a shape that corresponds to the contour of the body of the container.

The expanded parison should be confined in the second mold 7 in such a way that the outer edge of the parison will extend beyond that of the cavity 7b in the mold 7. Confining the expanded parison completely within the cavity 7b is not preferred since if the container to be produced has a complex profile, not all parts of the outer edge of the parison will come in close contact with the inner surfaces of the mold cavity in the subsequent step of additional expansion, no matter how small the degree of complexity may be. Another disadvantage will occur if the container to be produced has an increased degree of flatness i.e., the ratio of the larger diameter to the smaller diameter of a cross section of the container body, or A/B, in FIG. 4. As the parison is further expanded in the mold cavity, that part of the parison which is to make the smaller-diameter portion will first contact the inner surfaces of the cavity whereas that part of the parison which is to make the larger-diameter portion will then make gradual contact with the cavity. Because of this failure to achieve uniform expansion of the parison, a non-uniform wall-thickness distribution will occur in the parison, causing reduction in the reliability and yield of container products. This problem will become particularly noticeable when the degree of flatness (A/B in FIG. 4) of the container is 2.5 or more. Thus, the present invention will offer particular benefits in the case of producing containers having an A/B value of 2.5 or more.

Simultaneously with or right after the clamping of the mold 7, compressed air is blown into the portion 2c of the parison from the air nozzle 3 through the opening 6 so as to mold the parison to the shape of the final product (final blowing). The so shaped parison is then cooled.

Figure 1E:
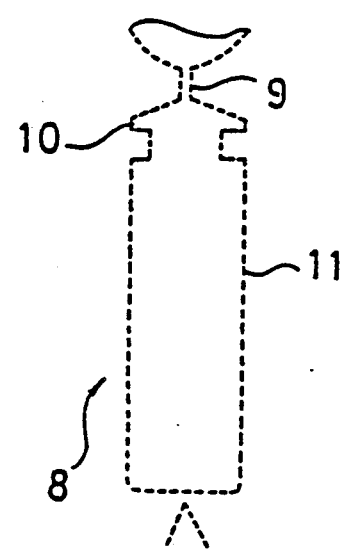
FIG. 1e is a diagram showing the container produced by the sequence of these steps.

After completion of the cooling, the first mold 5 and the second mold 7 are both opened, yielding a container 8 having the profile shown in FIG. 1e. The container 8 has the mouth portion 9 and the shoulder portion 10 which have been formed by the portions 5b and 5c, respectively, of the first mold 5, as well as the body 11 formed by the second mold 7. Both the mouth portion 9 and the shoulder portion 10 are thick-walled since they were not subjected to drafting in the first mold 5. On the other hand, the body 11 is thin-walled since it was drafted and formed so as to shape it against the side walls of the second mold 7. Thus, the container obtained is thick-walled in the mouth and shoulder portions and thin-walled in the body.

The portions 2d and 2a of the parison which do not make up the container 8 and the outer edge portions of the parison pinched by the second mold 7 are removed to complete the process of container production. The ratio of the wall thickness of the thicker portion to that of the thinner portion of the final product may be adjusted to 5 or more. Ratios of this order have been difficult to attain by the prior art but this can be easily achieved by the process of the present invention.

Any extrudable resin may be used in producing containers by process of the present invention. While polypropylene, polyethylene and TPX [the trademark of Mitsui Petrochemical Industries, Ltd. for poly(4-methyl-1-pentene)] are used with advantage, any other general-purpose resin may also be used. For molding containers of high transparency, resins of higher melt flow rates (MFR as measured by the method described in ASTM D-1238) are preferably used. By using the method of the present invention, even resin materials of high MRF values can be molded. Polypropylene preferably has a MFR value of no more than 10 g/10 min.

Any conventional type of extruder may be used. In order to prevent excessive drawdown of the parison, large-diameter dies are preferably used. If it is desired to swell the parison by a great degree, small dies are preferably used. In producing flat containers by the method of the present invention, care should be taken for various aspects of the molding operation including extrusion, opening and closing the molds, and shaping of the parison.

The differences between the containers produced by the method of the present invention and a conventional method are briefly described below. If one wants to make a container having a thick-walled neck portion 20, as shown in FIG. 2a, by a conventional method, uniform wall-thickness distribution is not attained in the body 21 and instead a thick-walled portion 21a and a thin-walled portion 21b will form, as shown in FIG. 2b. To avoid this problem, pre-blowing is usually performed but then only a thin-walled neck portion will result.

In accordance with the method of the present invention, the neck portion 20 of the parison is restricted by the first slidable mold 5 while the body 21 is drawn and subjected to preblowing. Thus, the neck portion 20 remains thick-walled whereas the body 21 comes out as a thin-walled portion that has a uniform wall-thickness distribution, as shown in FIG. 3b.

PREFERRED EMBODIMENT

The following example is given here for further illustrating the present invention but should not be taken as being limiting thereof.

EXAMPLE

Two containers having the profile and dimensions shown in FIG. 4 were produced, one being molded by the method of the present invention and the other by a conventional "direct" method. In the direct method, the parison is extruded farther beyond the second mold 7 and given the final shape by clamping it simultaneously with the first mold 5 and the second mold 7. The mold cavity had a shape corresponding to that of a container having a flatness degree of 4.7 (A/B =4.7 in FIG. 4). The resin used as the starting material was polypropylene F652 having a MFR of 5 g/10 min.

The extrusion was performed under the following conditions: die/core diameter ratio =70/64 mm, die head temperature =220° C., screw rotational speed =60 rpm, L/D =22, and screw diameter =50 mm. Drawing or drafting was conducted at a stroke of 240 mm and at a rate of 14 mm/sec. Preblowing of the expanded parison was conducted for 2 seconds at a rate of 400 L/h, and the final blowing was performed for 15 seconds at a pressure of 6 kgf/cm². The blown parison was cooled for 20 seconds to produce molded parts each weighing 40 g.

The two containers were checked for wall-thickness distribution at various sites of the neck portion 20 and body 21. The results are shown in Table 1 for the method of the present invention and in Table 2 for the conventional direct method. The ratio of the wall thickness of the neck portion to that of the body is shown in Table 3 for each container. The wall-thickness distribution of each container in the circumferential direction of the body was analyzed statistically and the results are shown in Table 4.

Table 3 shows that a container having a large wall-thickness ratio between the neck portion(mouth and shoulder) and the body can be produced by the method of the present invention. Table 4 shows that the container produced by the method of the present invention has a smaller variance in the wall thickness of the body.

TABLE 1

| | | | | | | | | | | (wall thickness: × 10 μm) | |
|---|---|---|---|---|---|---|---|---|---|---|---|
| | 1 | 2 | 3 | 4 | 5 | 6 | 7 | 8 | 9 | 10 | x̄ | σ |
| a | 225 | 216 | — | — | — | — | — | — | — | — | | |
| b | 33 | 26 | 22 | 26 | 31 | 37 | 26 | 20 | 21 | 28 | | |
| c | 33 | 28 | 23 | 27 | 33 | 37 | 31 | 25 | 25 | 31 | | |
| d | 43 | 38 | 35 | 34 | 43 | 45 | 43 | 32 | 34 | 42 | 38.9 | 4.57 |
| e | 48 | 47 | 50 | 51 | 53 | 52 | 52 | 53 | 48 | 45 | | |

TABLE 2

| | | | | | | | | | | (wall thickness: × 10 μm) | |
|---|---|---|---|---|---|---|---|---|---|---|---|
| | 1 | 2 | 3 | 4 | 5 | 6 | 7 | 8 | 9 | 10 | x̄ | σ |
| a | 132 | 140 | — | — | — | — | — | — | — | — | | |
| b | 40 | 31 | 13 | 11 | 37 | 44 | 31 | 12 | 14 | 36 | 36.9 | 12.31 |
| c | 40 | 34 | 17 | 15 | 40 | 44 | 37 | 16 | 14 | 37 | | |
| d | 52 | 46 | 23 | 19 | 52 | 54 | 52 | 20 | 23 | 50 | 39.1 | 14.95 |
| e | 57 | 55 | 34 | 32 | 64 | 65 | 62 | 34 | 36 | 54 | | |

TABLE 3

| | a | d | a/d |
|---|---|---|---|
| method of the invention | 220 | 38.9 | 5.66 |
| conventional method | 132 | 39.1 | 3.38 |

TABLE 4

| | average for site d (x) | standard deviation σ | variance (σ/x) |
|---|---|---|---|
| method of the invention | 38.9 | 4.57 | 0.12 |
| conventional method | 39.1 | 14.75 | 0.38 |

As described on the foregoing, the present invention provides a simple method by which the wall-thickness ratio of the neck portion to the body of a container can be made greater than has been attainable by the prior art methods. Further, the method of the present invention allows the wall-thickness ratio to be freely controlled so as to provide a thin-walled body having a uniform thickness distribution.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for producing a blow molded flat container having a thick-walled portion and a thin-walled portion, each portion respectively having a significantly different thickness from each other, said thin walled portion being of a uniform thickness, from a molten resin by using a separable mold comprising mold sections for forming the thick-walled portion and a separable mold comprising mold sections for forming the thin-walled portion, said thick-walled portion-forming mold having a cavity conforming to an outer configuration of the thick-walled portion of the flat container, and said thin-walled portion-forming mold having a cavity conforming to an outer configuration of the thin-walled portion of the flat container, comprising the steps of:

(a) extruding said molten resin from a die head to form a parison having a uniform wall thickness in its circumferential direction, said parison having an inner surface and a downstream end;

(b) closing said downstream end of said parison by pinching;

(c) forming a thick-walled portion of said container by closing said mold sections of said thick-walled portion-forming mold to confine a part of said parison, while introducing a sufficient amount of a fluid into said parison to prevent the inner surface of said parison from contacting itself;

(d) drawing a remaining portion of said parison, other than said thick-walled portion of said container, in a downstream direction at a ratio of at least 1.1, with the parison being maintained at a temperature not lower than the melting point of said resin;

(e) expanding said remaining portion of said parison by establishing a pressure differential between the interior and the exterior of said parison to form the thin-walled portion of said container having a wall thickness of the finished product, this expanded parison having a size larger than said cavity of said thin-walled portion-forming mold;

(f) closing said mold sections of said thin-walled portion-forming mold to confine said expanded remaining portion of said parison within said cavity to flatten said expanded remaining portion of said parison, said expanded remaining portion of said parison partly extending beyond a parting line being sandwiched between contacting edges of said mold sections of said separable mold, such that the part extending beyond said parting line is fused to form a container edge; and (g) introducing a pressurized fluid into said parison confined in said molds to force said parison in close contact with the cavities of the molds to produce said desired flat container.

2. A process according to claim 1, wherein the ratio of the wall thickness of the thicker portion of the molded container to that of the thinner portion is at least 5.

3. A process according to claim 1 or 2 wherein the flatness of the molded container, is at least 2.5.

4. A process according to claim 1, wherein said resin is selected from at least one member of the group consisting of polypropylene, polyethylene or poly(4-methyl-1-pentene).

* * * * *